US007669093B2

(12) United States Patent
Nakagawa

(10) Patent No.: US 7,669,093 B2
(45) Date of Patent: Feb. 23, 2010

(54) INFORMATION RADIO TRANSMISSION SYSTEM

(75) Inventor: Nobuyuki Nakagawa, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 593 days.

(21) Appl. No.: 11/449,712

(22) Filed: Jun. 9, 2006

(65) Prior Publication Data

US 2007/0178847 A1 Aug. 2, 2007

(30) Foreign Application Priority Data

Nov. 16, 2005 (JP) .............................. 2005-331588

(51) Int. Cl.
 *G01R 31/28* (2006.01)
 *H03M 13/00* (2006.01)
(52) U.S. Cl. ...................................... 714/715; 714/776
(58) Field of Classification Search ................. 714/712, 714/715, 735, 748, 749, 819, 799
See application file for complete search history.

(56) References Cited

U.S. PATENT DOCUMENTS

| | | | | |
|---|---|---|---|---|
| 5,008,953 | A * | 4/1991 | Dahlin et al. | 455/423 |
| 5,553,056 | A * | 9/1996 | Bronte et al. | 370/253 |
| 6,341,224 | B1 * | 1/2002 | Dohi et al. | 455/522 |
| 6,760,320 | B1 * | 7/2004 | Bune | 370/342 |
| 7,424,054 | B2 * | 9/2008 | Kim et al. | 375/232 |
| 2006/0100827 | A1 * | 5/2006 | Kim | 702/189 |

FOREIGN PATENT DOCUMENTS

| | | |
|---|---|---|
| JP | 11-266229 A | 9/1999 |
| JP | 11-308297 A | 11/1999 |

* cited by examiner

*Primary Examiner*—Phung M. Chung
(74) *Attorney, Agent, or Firm*—Buchanan Ingersoll & Rooney PC

(57) ABSTRACT

An information radio transmission system is provided that enables provision of correct control information on the transmitting side irrespective of the error volume when an error occurs in communication data. Error volume measuring data string storage units that store an error volume measuring data string are provided in both a transmitting-side communication device that transmits data by radio transmission and a receiving-side communication device that receives data transmitted from the transmitting-side communication device. The receiving-side communication device has an error volume measuring unit that measures the error volume when transmitting data. An error volume measuring data string is added to data and the data is transmitted from the transmitting-side communication device. Having received this, in the receiving-side communication device, the error volume measuring unit compares the error volume measuring data transmitted from the transmitting-side communication device with an error volume measuring data string stored in an error volume measuring data string storage unit of the receiving-side communication device, thereby measuring the error volume.

10 Claims, 19 Drawing Sheets

FIG. 13
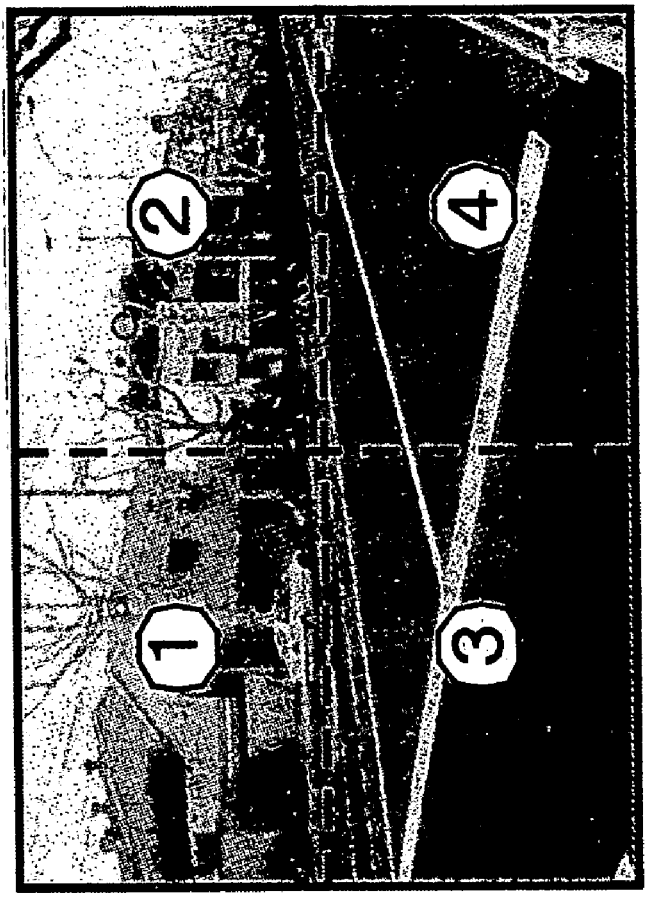
DIVIDE INTO TILES
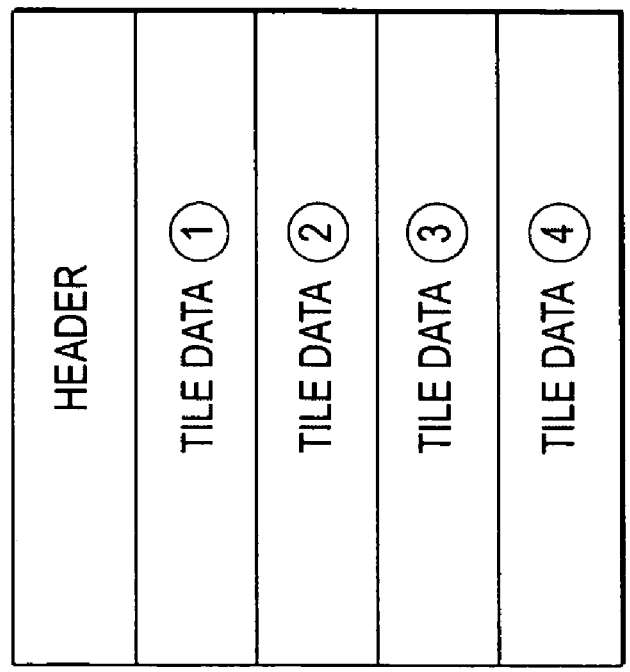
JPEG 2000 DATA STRUCTURE

FIG. 14
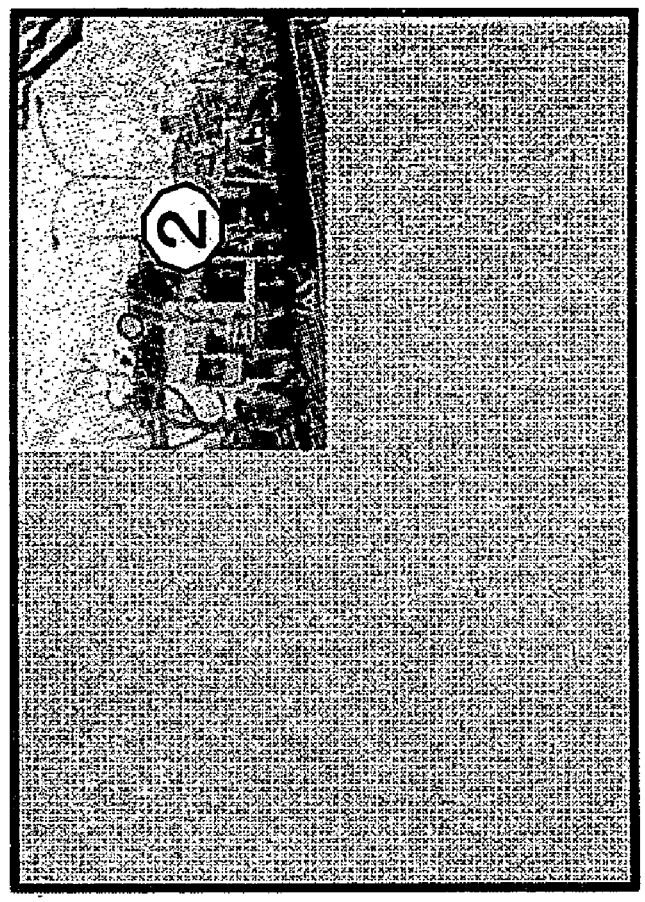
PARTIAL IMAGE
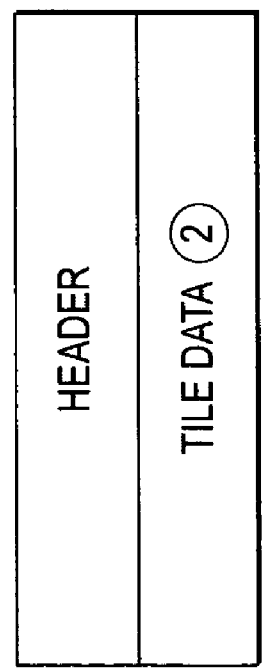
HEADER + PART OF TILES

FIG. 15
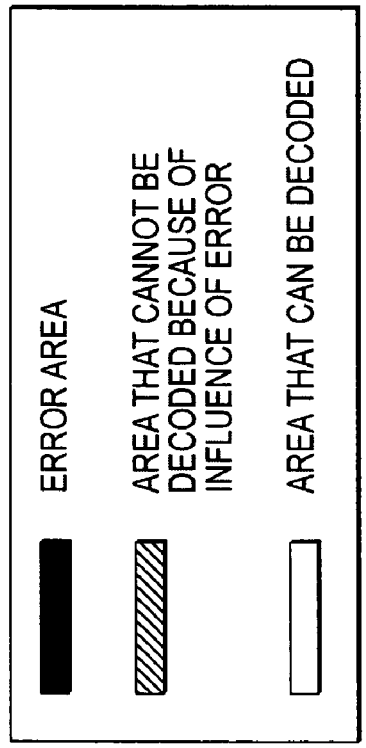
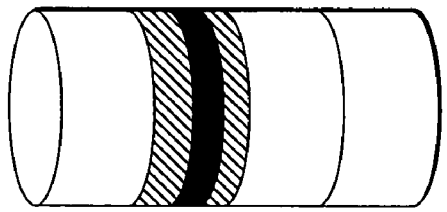
QUADRISECTION
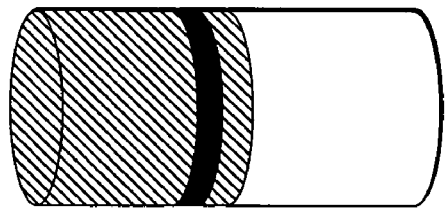
BISECTION
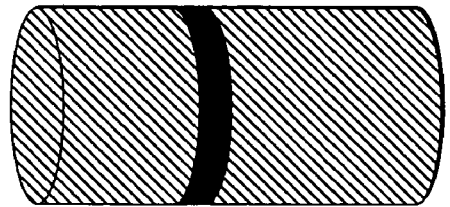
NO DIVISION FIG. 16
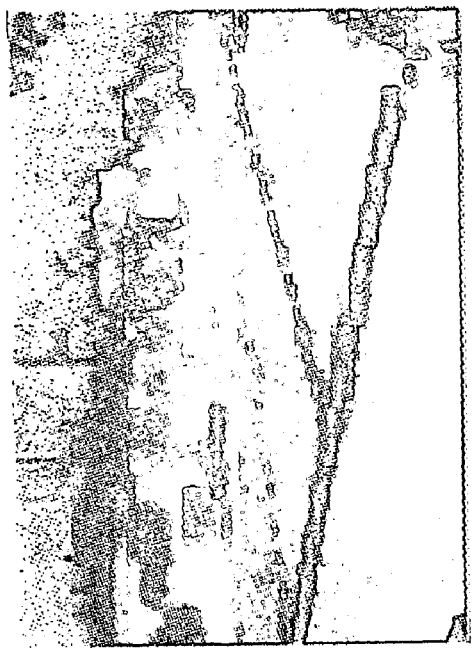
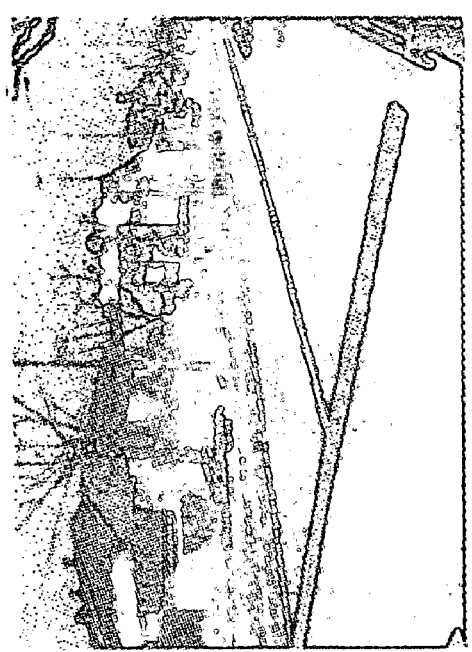
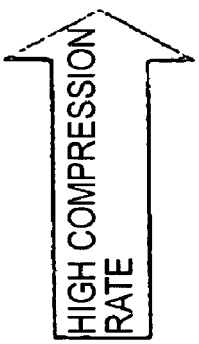
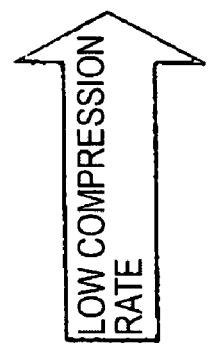
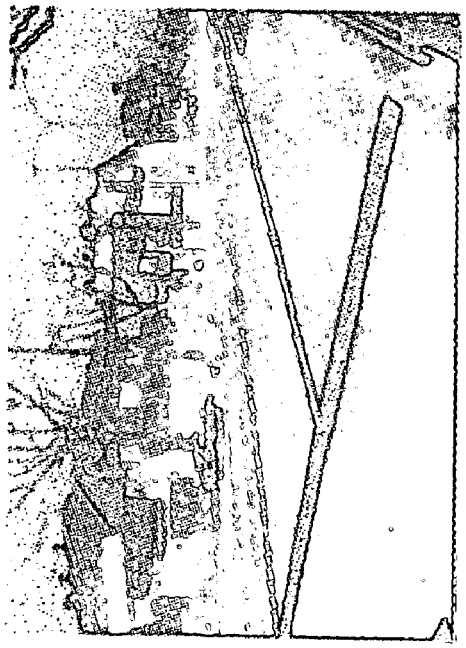

FIG. 18
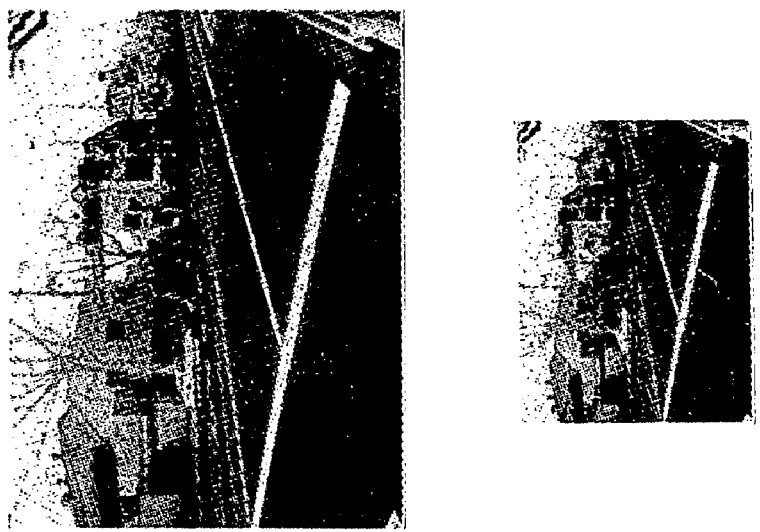
LARGE LONGITUDINAL AND LATERAL SIZE
SMALL LONGITUDINAL AND LATERAL SIZE
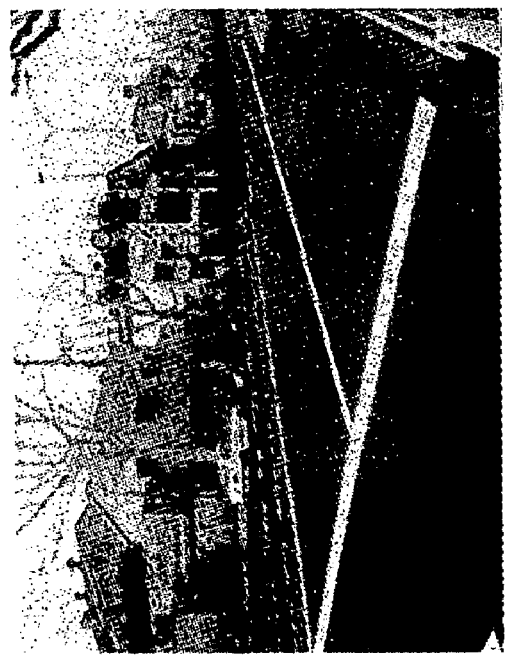

INFORMATION RADIO TRANSMISSION SYSTEM

BACKGROUND OF THE INVENTION

1. Field of the Invention

This invention relates to an information radio transmission system that performs radio transmission of digital data such as static image data.

2. Description of the Related Art

Many of the conventional radio data transmissions employ a retransmission mode. That is, when an error occurs in transmitted data, the receiving side requests the transmitting side to retransmit the data area where the error has occurred, thereby realizing reliable data transfer.

In this case, if the condition of the transmission line is bad and data has a large error volume, the volume of retransmitted data increases. Errors also occur in the retransmission of data. Therefore, it is considered that as the volume of transmitted data increases, the volume of retransmitted data exponentially increases. As the volume of retransmitted data increases, it takes time to transfer data and the time during which the transmission line is occupied becomes longer. This is not preferable. Thus, a method of controlling transmitted data in accordance with the condition of the transmission line is proposed. Since the condition of the radio transmission line varies depending on the peripheral environment and time, it is necessary to control data in accordance with the variance of the transmission state.

JP-A-11-308297 (pages 3 to 6 and FIG. 1) discloses a method of measuring the error volume in received data on the receiving side, preparing control information, sending the control information from the receiving side to the transmitting side, and setting the volume of transmitted data of the next transmission based on the control information on the transmitting side, thereby transmitting optimum data in a minimum time. Here, as a method of preparing control information, it is proposed to utilize data that is usually transmitted and received, and compare a bit string of received data with a bit string acquired by performing error correction of the received data.

JP-A-11-266229 (pages 3 to 4 and FIG. 1) discloses a method of controlling the frame rate of a dynamic image in accordance with the condition of the transmission state, and thus preventing turbulence in the dynamic image or interruption of received static image on the receiving side even when the error volume varies, thereby securing the quality of the system.

In the conventional technique of JP-A-11-308297, the error volume is measured from data that is usually communicated. When data is received, error correction of the received data is performed. The resulting error-corrected data is compared with the data before the error correction, thus measuring the error volume. However, when an error exceeding the error correcting ability occurs, error correction cannot be performed, and the receiving side cannot acquire the original data and cannot measure the error volume accurately. Therefore, there is a problem that it is difficult to control transmitted data in accordance with the condition of the transmission line.

The conventional technique of JP-A-11-266229 proposes a method of controlling the frame rate on the basis of the error volume when a dynamic image is used as transmitted data. However, it proposes no method of controlling transmitted data in accordance with the condition of the transmission line when a static image is used as transmitted data. There is a problem that the image quality may be degraded if the volume of transmitted data is simply controlled.

SUMMARY OF THE INVENTION

In view of the foregoing status of the art, it is an object of this invention to provide an information radio transmission system that enables the transmitting side to acquire accurate control information irrespective of the error volume when errors occur in communication data.

It is another object of this invention to provide an information radio transmission system that enables the transmitting side to control transmitted data of static image in accordance with the condition of the transmission line while preventing degradation in the image quality.

An information radio transmission system according to an aspect of this invention has a transmitting-side communication device that transmits data by radio transmission and a receiving-side communication device that receives the data transmitted from the transmitting-side communication device. Each of the transmitting-side communication device and the receiving-side communication device has an error volume measuring data string storage unit that stores an error volume measuring data string. At least one of the transmitting-side communication device and the receiving-side communication device has an error volume measuring unit that measures an error volume in data transmission. The error volume measuring unit compares the error volume measuring data transmitted from the other device with the error volume measuring data string stored in the error volume measuring data string storage unit of the one device, thereby measuring the error volume.

As described above, according to this invention, in the information radio transmission system having a transmitting-side communication device that transmits data by radio transmission and a receiving-side communication device that receives the data transmitted from the transmitting-side communication device, each of the transmitting-side communication device and the receiving-side communication device has an error volume measuring data string storage unit that stores an error volume measuring data string. At least one of the transmitting-side communication device and the receiving-side communication device has an error volume measuring unit that measures an error volume in data transmission. The error volume measuring unit compares the error volume measuring data transmitted from the other device with the error volume measuring data string stored in the error volume measuring data string storage unit of the one device, thereby measuring the error volume. Therefore, even when an error exceeding the error correcting ability occurs, the error volume can be accurately measured.

BRIEF DESCRIPTION OF THE DRAWINGS

FIG. 13 is a diagram for explaining the data structure of JPEG 2000;

FIG. 14 is a diagram for explaining a tile division function of JPEG 2000;

FIG. 15 is a diagram for explaining the tile division function of JPEG 2000;

FIG. 16 is a diagram for explaining a mode of changing the data size of an image;

FIG. 18 is a diagram for explaining a mode of changing the data size of an image.

DETAILED DESCRIPTION OF THE PREFERRED EMBODIMENTS

Embodiment 1

In Embodiment 1, both a transmitting-side communication device and a receiving-side communication device are provided with error volume measuring data string storage units, and the same error volume measuring data string is stored in the error volume measuring data string storage units of both communication devices. Together with a data string transmitted from the transmitting-side communication device to the receiving-side communication device, the error volume measuring data string is transmitted. The error volume measuring data string received by the receiving-side communication device is compared with the error volume measuring data string stored in advance in the error volume measuring data string storage unit of the receiving-side communication device, thus measuring the error volume.

This enables accurate measurement of the error volume even when an error exceeding the error correcting ability occurs.

Hereinafter, Embodiment 1 of this invention will be described with reference to the drawings.

Figure 1:
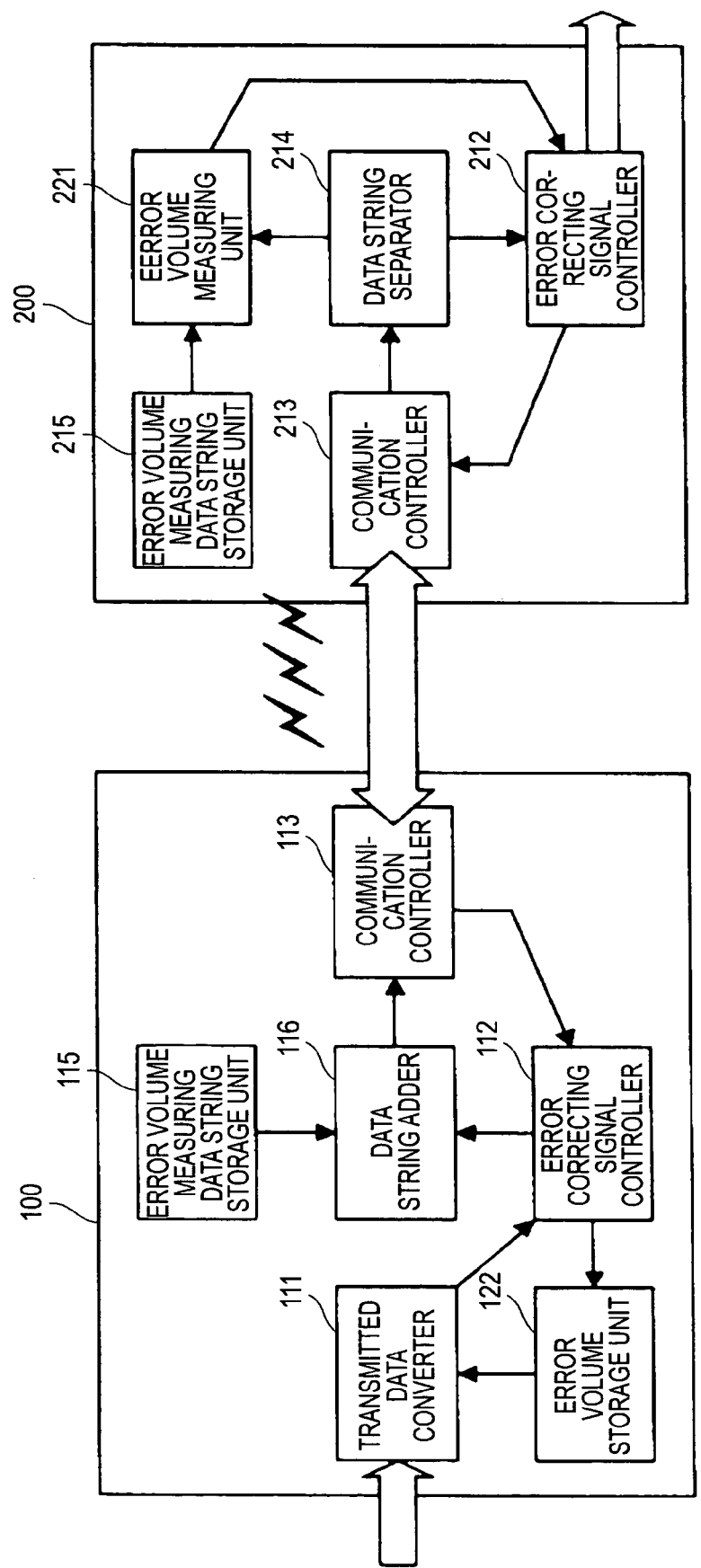
FIG. 1 is a block diagram showing the structure of an information radio transmission system according to Embodiment 1 of this invention.

FIG. 1 is a block diagram showing the structure of an information radio transmission system according to Embodiment 1 of this invention.

In FIG. 1, the information radio transmission system includes a transmitting-side communication device 100 and a receiving-side communication device 200. The transmitting-side communication device 100 is constructed as follows.

A transmitted data converter 111 processes transmitted data on the basis of the error volume. An error correcting signal controller 112 encodes and decodes an error correcting signal. A communication controller 113 controls transmission and reception of data. An error volume measuring data string storage unit 115 stores a data string for error volume measurement. A data string adder 116 adds the error volume measuring data string to the transmitted data string after the error correction coding. An error volume storage unit 122 stores the history of the error volume.

The receiving-side communication device 200 is constructed as follows.

An error correcting signal controller 212 encodes and decodes an error correcting signal. A communication controller 213 controls transmission and reception of data. A data string separator 214 separates received data into actual data and an error volume measuring data string. An error volume measuring data string storage unit 215 stores the data string for error volume measurement. An error volume measuring unit 221 measures the error volume in data transmission.

Figure 2:
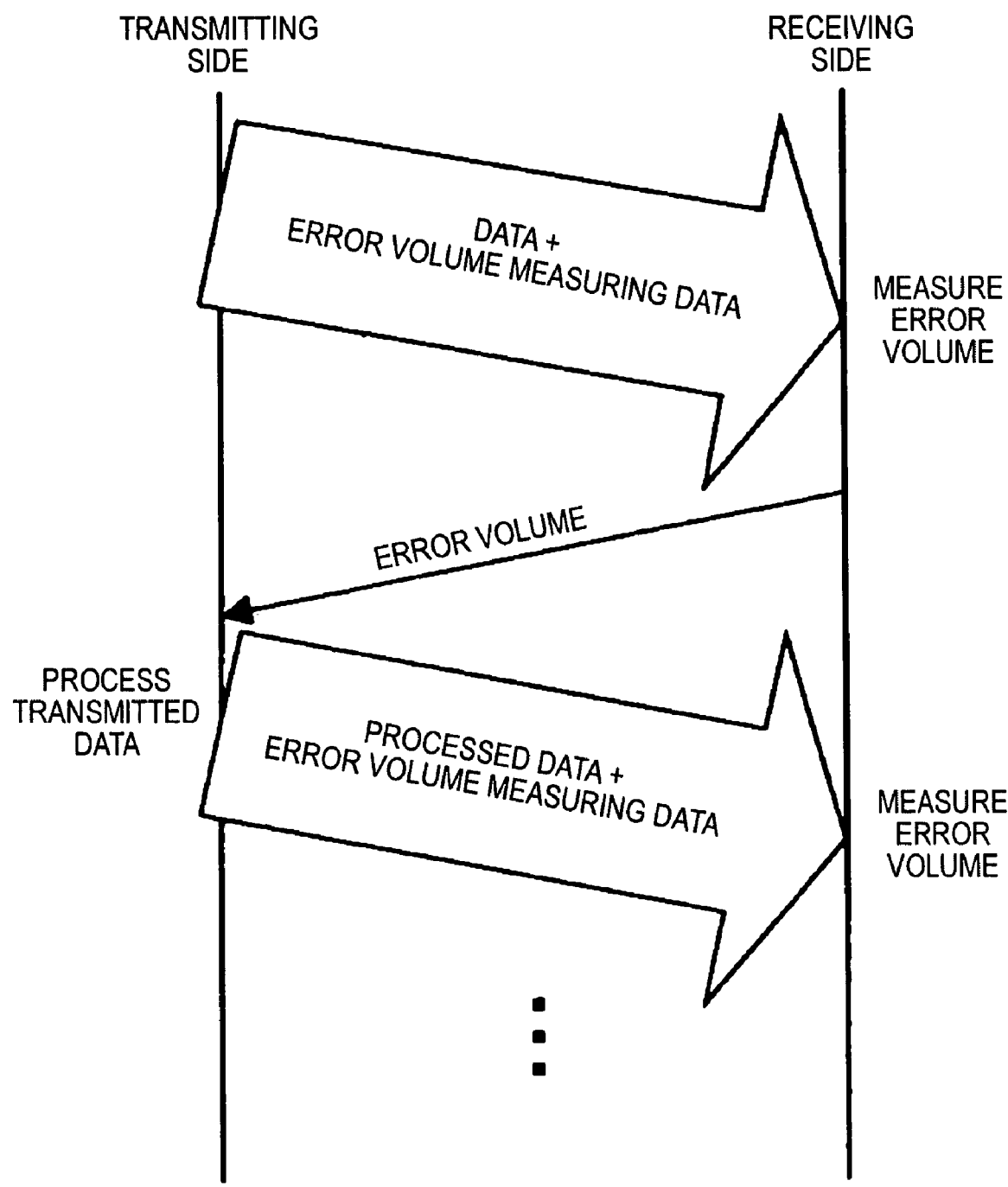
FIG. 2 is a sequence chart showing the operation of the information radio transmission system according to Embodiment 1 of this invention.

FIG. 2 is a sequence chart showing the operation of the information radio transmission system according to Embodiment 1 of this invention.

The operation will now be described.

When transmitting data, first, the condition of the transmission line, that is, the error volume in data transmission is checked. This is done in accordance with the following procedure. In the transmitting-side communication device 100 of FIG. 1, transmitted data is provided from the transmitted data converter 111 to the error correcting signal controller 112, and error correction coding is performed to acquire a transmitted data string. The data string adder 116 adds an error volume measuring data string stored in the error volume measuring data string storage unit 115 to the transmitted data string. The resulting data string is transmitted from the communication controller 113.

In the receiving-side communication device 200, the communication controller 213 receives the data string and provides it to the data string separator 214. The data string separator 214 separates the transmitted data string from the received data string and provides it to the error correcting signal controller 212. The data string separator 214 also provides the error volume measuring data string from the received data string to the error volume measuring unit 221. The error correcting signal controller 212 performs error correction of the transmitted data it received, and thus acquires a received data string. The error volume measuring unit 221 compares the received error volume measuring data string with an error volume measuring data string stored in advance in the error volume measuring data string storage unit 215. The error volume is measured from the result of this comparison.

Next, the error volume prepared in the receiving-side communication device 200 is sent back to the transmitting-side communication device 100. Therefore, the error volume measuring unit 221 provides the measured error volume to the error correcting signal controller 212. The error correcting signal controller 212 performs error correction coding of the received error volume and the result is sent back from the communication controller 213 to the transmitting-side communication device 100.

In the transmitting-side communication device 100, the communication controller 113 receives the data of the coded error volume. The error correcting signal controller 112 decodes the received data. The error volume thus acquired is stored into the error volume storage unit 122.

In Embodiment 1, in this manner, the error volume is measured every time data is transmitted, and the measured error volume is used as control information for the next data transmission. That is, when transmitting data, the transmitted data converter 111 controls transmitted data on the basis of the latest error volume stored in the error volume storage unit 122.

According to Embodiment 1, the error volume can be accurately measured even when an error exceeding the error correction ability occurs. As the volume of transmitted data of the next transmission is controlled on the basis of this error volume, optimum data transmission can be realized. This enables improvement in the data transmission efficiency.

Embodiment 2

In Embodiment 1, an error volume measuring data string is transmitted together with transmitted data from the transmitting-side communication device and the error volume is measured in the receiving-side communication device. However, the method for transmitting an error volume measuring data string can be changed. In Embodiment 2, the transmitting-side communication device requests an error volume measuring data string from the receiving-side communication device. In response to this, the receiving-side communication device sends back an error volume measuring data string, and the transmitting-side communication device measures the error volume.

This enables accurate measurement of the error volume even when an error exceeding the error correcting ability occurs.

Hereinafter, Embodiment 2 of this invention will be described with reference to the drawings.

Figure 3:
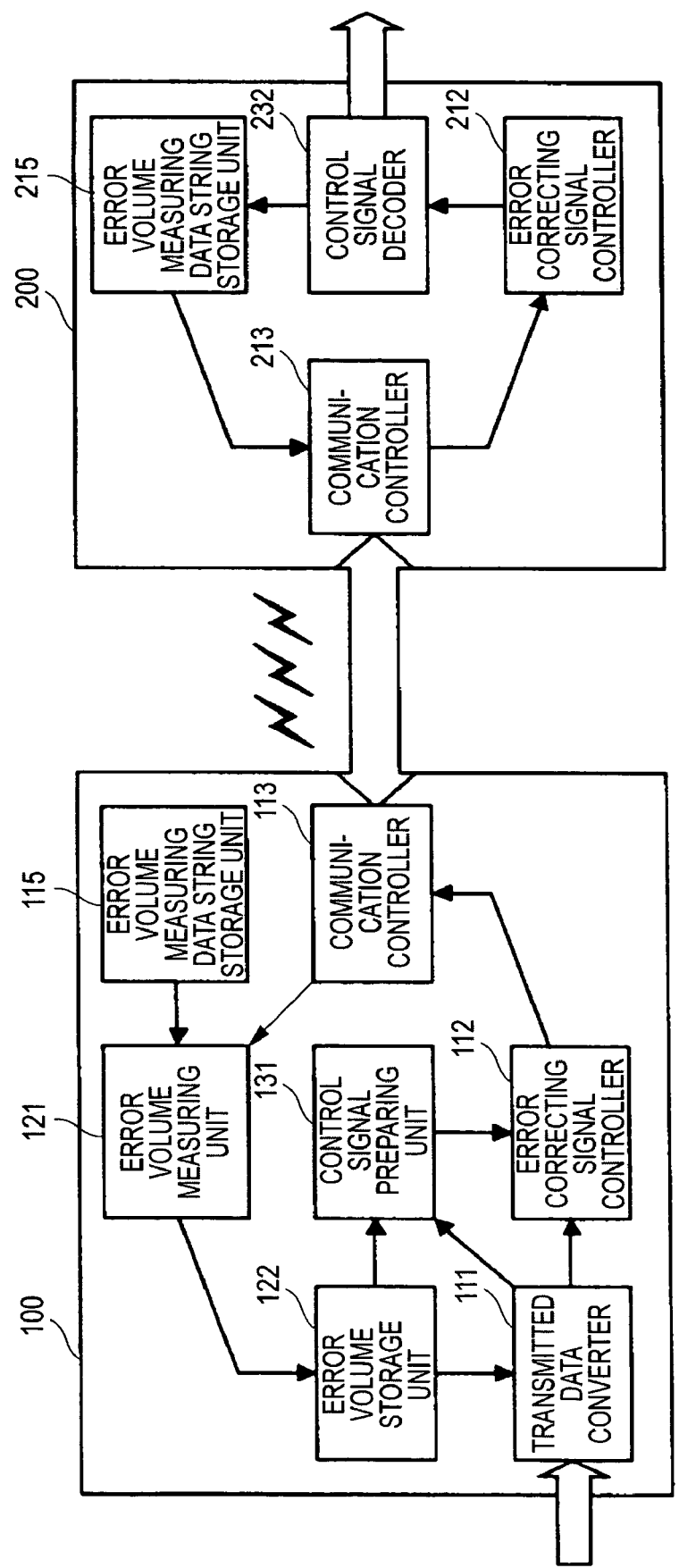
FIG. 3 is a block diagram showing the structure of an information radio transmission system according to Embodiment 2 of this invention.

FIG. 3 is a block diagram showing the structure of an information radio transmission system according to Embodiment 2 of this invention.

In FIG. 3, 100, 111 to 113, 115, 122, 200, 212, 213 and 215 represent the same elements as in FIG. 1. In FIG. 3, the transmitting-side communication device 100 has an error volume measuring unit 121 that measures the error volume, and a control signal preparing unit 131 that prepares a control signal to request error volume measuring data when transmitting data. The receiving-side communication device 200 has a control signal decoder 232 that acquires and decodes a control signal from a received data string.

Figure 4:
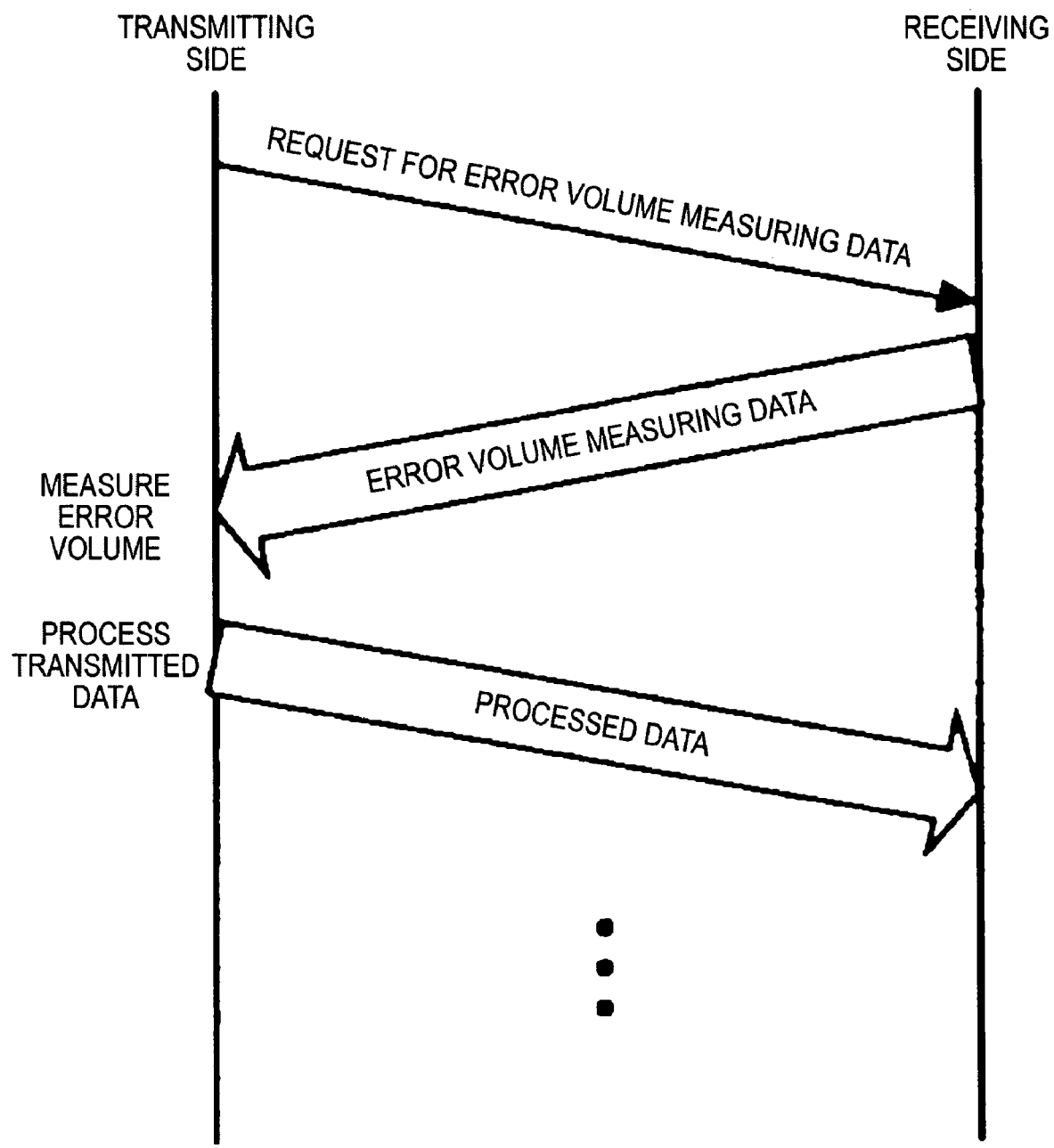
FIG. 4 is a sequence chart showing the operation of the information radio transmission system according to Embodiment 2 of this invention.

FIG. 4 is a sequence chart showing the operation of the information radio transmission system according to Embodiment 2 of this invention.

The operation will now be described.

When transmitting data, first, the condition of the transmission line is checked. This is done in accordance with the following procedure. The control signal preparing unit 131 of the transmitting-side communication device 100 of FIG. 3 prepares a control signal to request an error volume measuring data string. Next, the error correcting signal controller 112 performs error correction coding of this control signal. The resulting data string is transmitted from the communication controller 113.

In the receiving-side communication device 200, the communication controller 213 receives the data and provides the data to the error correcting signal controller 212. The error correcting signal controller 212 performs error correction decoding of the received data. The data string acquired as the result of the decoding is provided to the control signal decoder 232. The control signal decoder 232 examines the received data, and if the control signal is for requesting an error volume measuring data string, the control signal decoder 232 notifies the error volume measuring data string storage unit 215 of this information. The error volume measuring data string storage unit 215, in response to the request for an error volume measuring data string, sends back an error volume measuring data string stored in the error volume measuring data string storage unit 215 from the communication controller 213 to the transmitting-side communication device 100.

In the transmitting-side communication device 100, the communication controller 113 receives the error volume measuring data string and provides it to the error volume measuring unit 121. The error volume measuring unit 121 compares the received error volume measuring data string with an error volume measuring data string stored in advance in the error volume measuring data string storage unit 115, and measures the error volume from the result of this comparison. The error volume thus acquires is stored into the error volume storage unit 122.

In Embodiment 2, in this manner, the error volume is measured from the error volume measuring data string transmitted from the receiving-side communication device to the transmitting-side communication device, and this error volume is used as control information. That is, when transmitting data, the transmitted data converter 111 controls transmitted data on the basis of the latest error volume stored in the error volume storage unit 122.

According to Embodiment 2, the error volume can be accurately measured even when an error exceeding the error correction ability occurs. As the volume of transmitted data of the next transmission is controlled on the basis of this error volume, optimum data transmission can be realized. This enables improvement in the data transmission efficiency.

Embodiment 3

In Embodiment 1, an error volume measuring data string is transmitted together with transmitted data from the transmitting-side communication device and the error volume is measured in the receiving-side communication device. However, the method for transmitting an error volume measuring data string can be changed. In Embodiment 3, an error volume measuring data string is transmitted together with a data string transmitted from the receiving-side communication device to the transmitting-side communication device, and the error volume measuring data string received by the transmitting-side communication device is compared with an error volume measuring data string stored in advance in the error volume measuring data string storage unit of the transmitting-side communication device, thus measuring the error volume.

This enables accurate measurement of the error volume even when an error exceeding the error correcting ability occurs.

Hereinafter, Embodiment 3 of this invention will be described with reference to the drawings.

Figure 5:
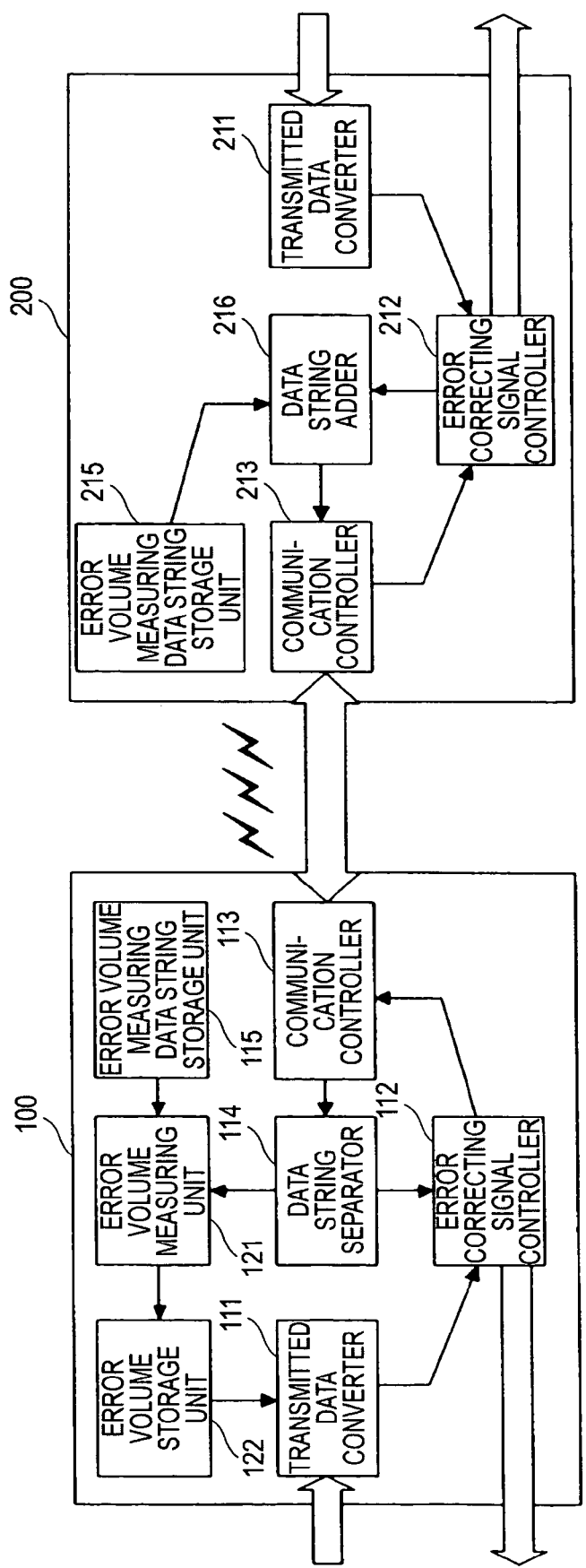
FIG. 5 is a block diagram showing the structure of an information radio transmission system according to Embodiment 3 of this invention.

FIG. 5 is a block diagram showing the structure of an information radio transmission system according to Embodiment 3 of this invention.

In FIG. 5, 100, 111 to 113, 115, 121, 122, 200, 212, 213 and 215 represent the same elements as in FIG. 3. In FIG. 5, the transmitting-side communication device 100 has a data string separator 114 that separates received data into actual data and an error volume measuring data string. The receiving-side communication device 200 has a transmitted data converter 211 that processes transmitted data on the basis of the error volume, and a data string adder 216 that adds an error volume measuring data string to the transmitted data string after error correction coding.

Figure 6:
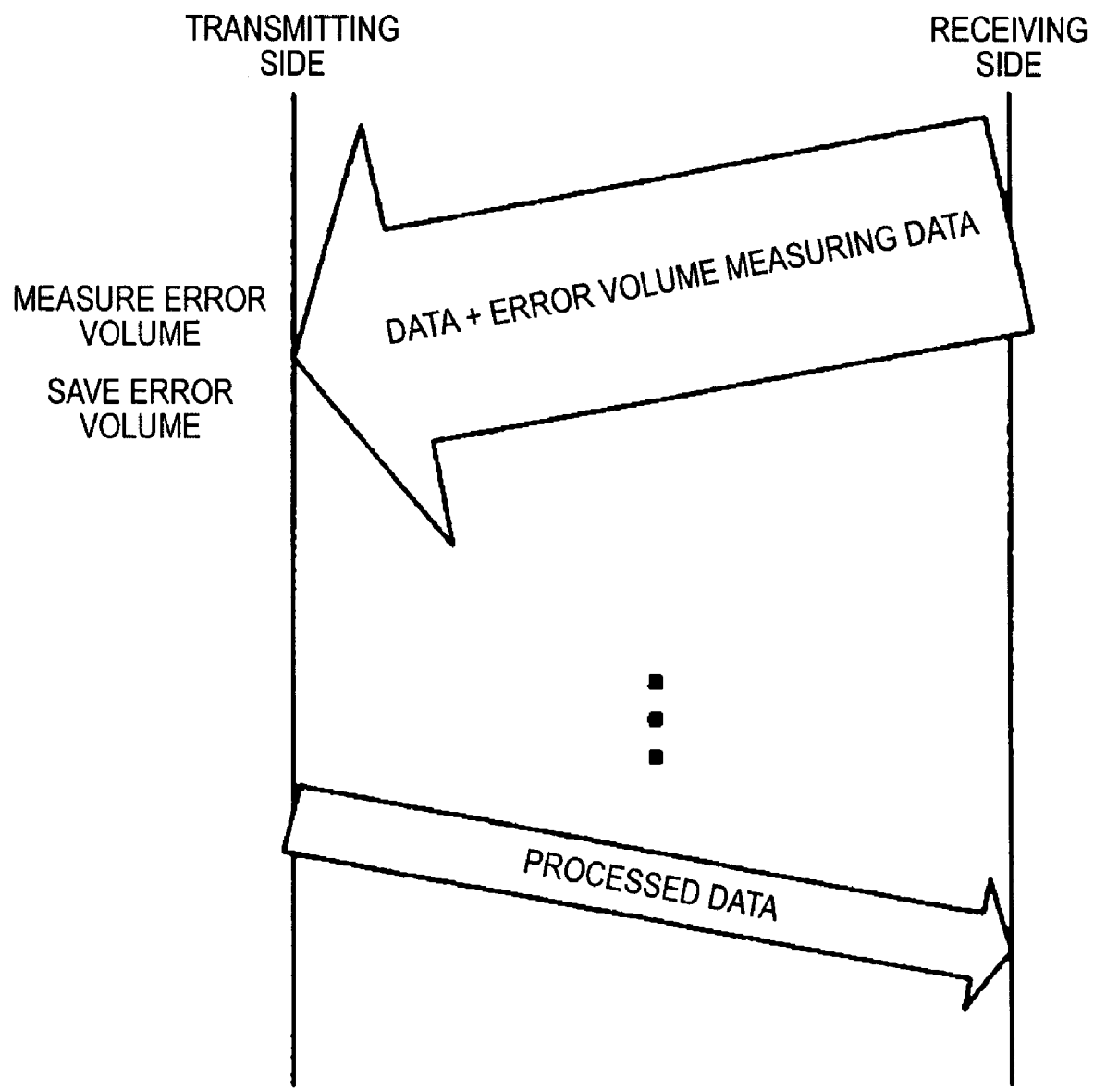
FIG. 6 is a sequence chart showing the operation of the information radio transmission system according to Embodiment 3 of this invention.

FIG. 6 is a sequence chart showing the operation of the information radio transmission system according to Embodiment 3 of this invention.

The operation will now be described.

When transmitting data, first, the condition of the transmission line is checked. This is done in accordance with the following procedure. In the receiving-side communication device 200 of FIG. 5, the transmitted data converter 211 provides transmitted data to the error correcting signal controller 212, and error correction coding is performed to acquire a data string. The data string adder 216 adds an error volume measuring data string stored in the error volume measuring data string storage unit 215 to the transmitted data string. The data string thus acquired is transmitted from the communication controller 213.

In the transmitting-side communication device 100, the communication controller 113 receives the data string and provides it to the data string separator 114. The data string separator 114 separates the transmitted data string from the received data string and provides it to the error correcting signal controller 112. The data string separator 114 also provides the error volume measuring data string from the received data string to the error volume measuring unit 121. The error correcting signal controller 112 performs error correction of the transmitted data it received, and thus acquires the received data string. The error volume measuring unit 121 compares the received error volume measuring data string with an error volume measuring data string stored in advance in the error volume measuring data string storage unit 115. The error volume is measured form the result of this comparison. The error volume thus acquires is stored into the error volume storage unit 122.

In Embodiment 3, in this manner, the error volume is measured from the error volume measuring data string added to the data and thus transmitted from the receiving-side communication device, and this error volume is used as control information. That is, when transmitting data, the transmitted data converter 111 controls transmitted data on the basis of the latest error volume stored in the error volume storage unit 122.

According to Embodiment 3, the error volume can be accurately measured even when an error exceeding the error correction ability occurs. As the volume of transmitted data of the next transmission is controlled on the basis of this error volume, optimum data transmission can be realized. This enables improvement in the data transmission efficiency.

Embodiment 4

In Embodiment 4, the error volume is measured from the number of received packets and the number of packets in which error correction have been done.

Thus enables easy measurement of the error volume even when an error exceeding the error correcting ability occurs, and also enables reduction in the time required for measuring processing and simplification of the construction.

Hereinafter, Embodiment 4 of this invention will be described with reference to the drawings.

Figure 7:
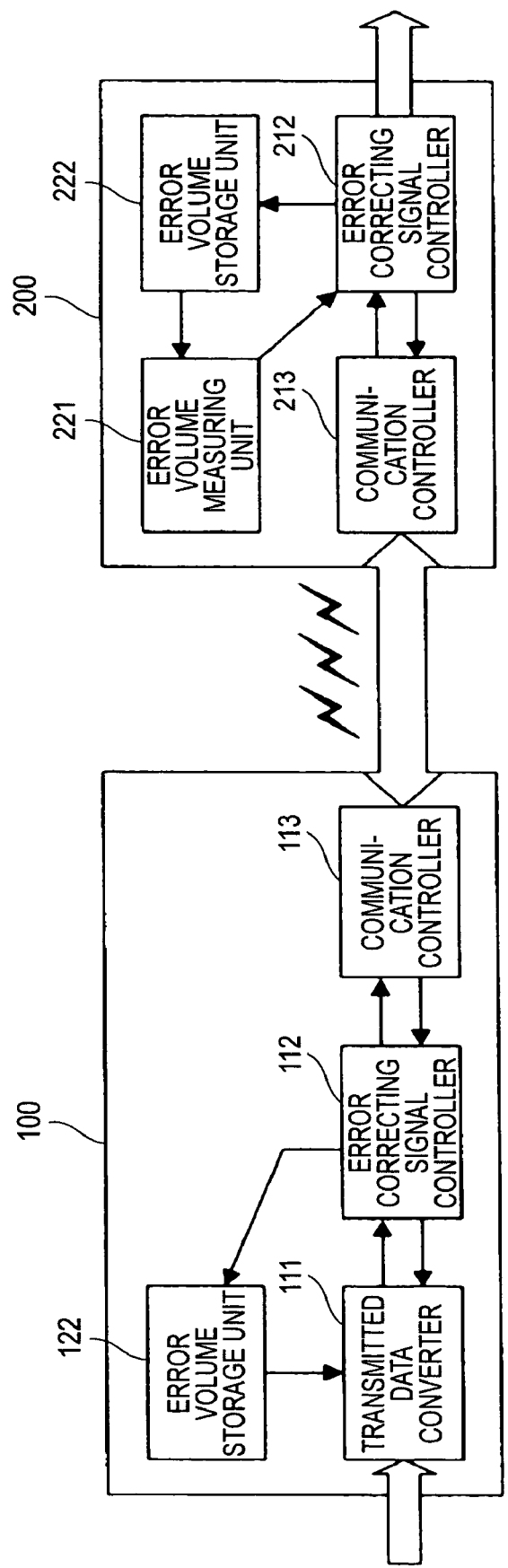
FIG. 7 is a block diagram showing the structure of an information radio transmission system according to Embodiment 4 of this invention.

FIG. 7 is a block diagram showing the structure of an information radio transmission system according to Embodiment 4 of this invention.

In FIG. 7, 100, 111 to 113, 122, 200, 212, 213 and 221 represent the same elements as in FIG. 1. In FIG. 7, the receiving-side communication device 200 has an error volume storage unit 222 that stores the history of the error volume.

Figure 8:
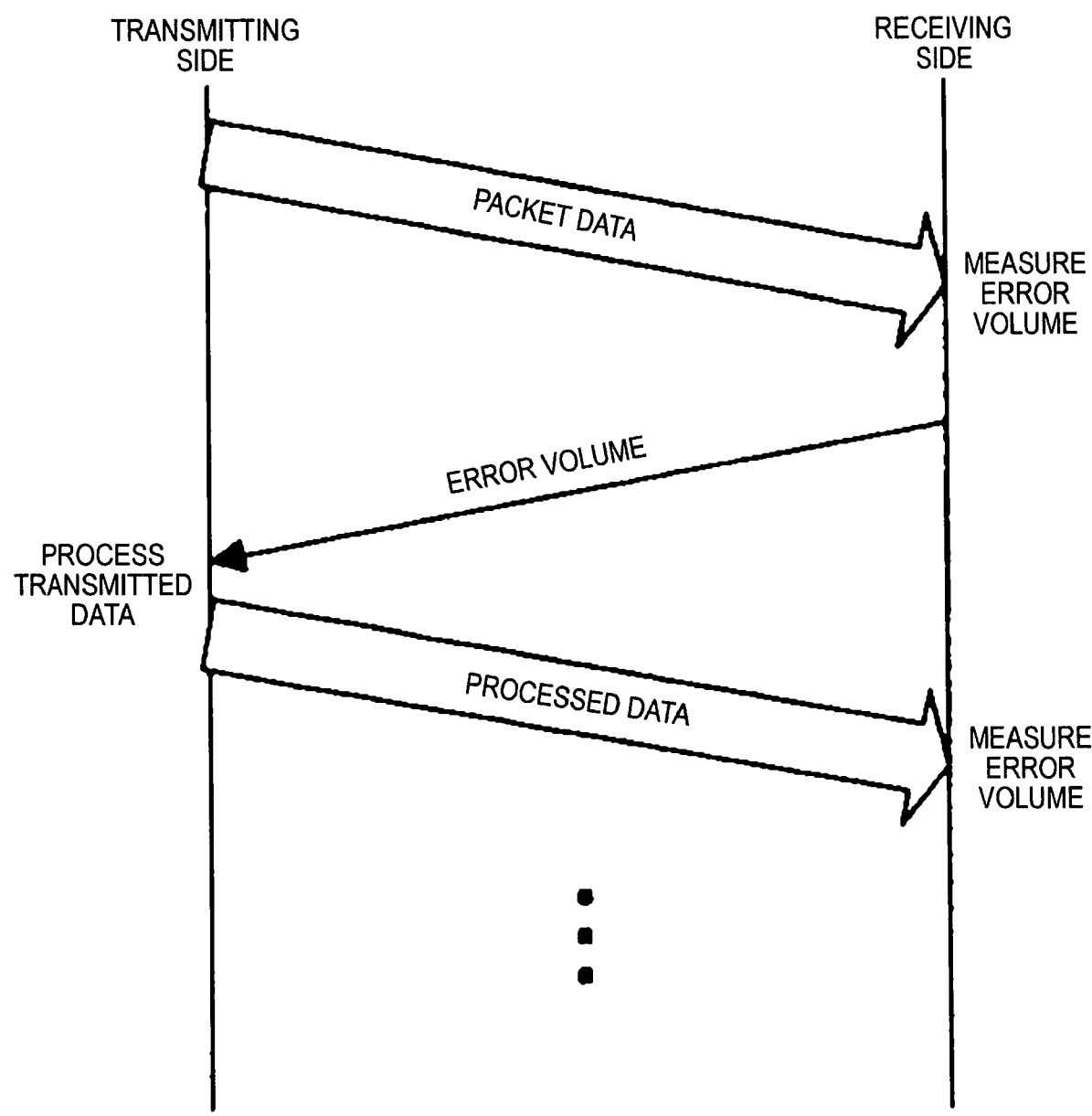
FIG. 8 is a sequence chart showing the operation of the information radio transmission system according to Embodiment 4 of this invention.

FIG. 8 is a sequence chart showing the operation of the information radio transmission system according to Embodiment 4 of this invention.

The operation will now be described.

When transmitting data, first, the condition of the transmission line is checked. This is done in accordance with the following procedure. In the transmitting-side communication device 100 of FIG. 7, transmitted data is provided from the transmitted data converter 111 to the error correcting signal controller 112, and error correction coding is performed to acquire a data string. The resulting data string is transmitted as packet data from the communication controller 113.

In the receiving-side communication device 200, the communication controller 213 receives the data and the error correcting signal controller 212 decodes the data. Information of whether the received data have been successfully decoded or not is sent to the error volume storage unit 222. Next, the error volume measuring unit 221 measures the error volume from the history of the information of whether the data have been successfully decoded or not, stored in the error volume storage unit 222. The error volume measured in the receiving-side communication device 200 is encoded and transmitted to the transmitting-side communication device 100.

In the transmitting-side communication device 100, the communication controller 113 receives the data of the encoded error volume. The error correcting signal controller 112 decodes the received data. The error volume thus acquired is stored into the error volume storage unit 122.

In Embodiment 4, in this manner, the error volume is measured from the packet data transmitted from the transmitting-side communication device, and this error volume is used as control information. That is, when transmitting data, the transmitted data converter 111 controls transmitted data on the basis of the latest error volume stored in the error volume storage unit 122.

According to Embodiment 4, the error volume can be accurately measured without using an error volume measuring data string even when an error exceeding the error correction ability occurs. As the volume of transmitted data of the next transmission is controlled on the basis of this error volume, optimum data transmission can be realized. This enables improvement in the data transmission efficiency.

Embodiment 5

In Embodiment 5, the receiving-side communication device sends back to the transmitting-side communication device a data string received from the transmitting-side communication device. In the transmitting-side communication device, the received sent-back data is compared with the original data transmitted by the transmitting-side communication device, thus measuring the error volume.

This enables accurate measurement of the error volume even when an error exceeding the error correcting ability occurs. As the volume of transmitted data of the next transmission is controlled on the basis of this error volume, optimum data transmission can be realized. This enables improvement in the data transmission efficiency.

Hereinafter, Embodiment 5 of this invention will be described with reference to the drawings.

Figure 9:
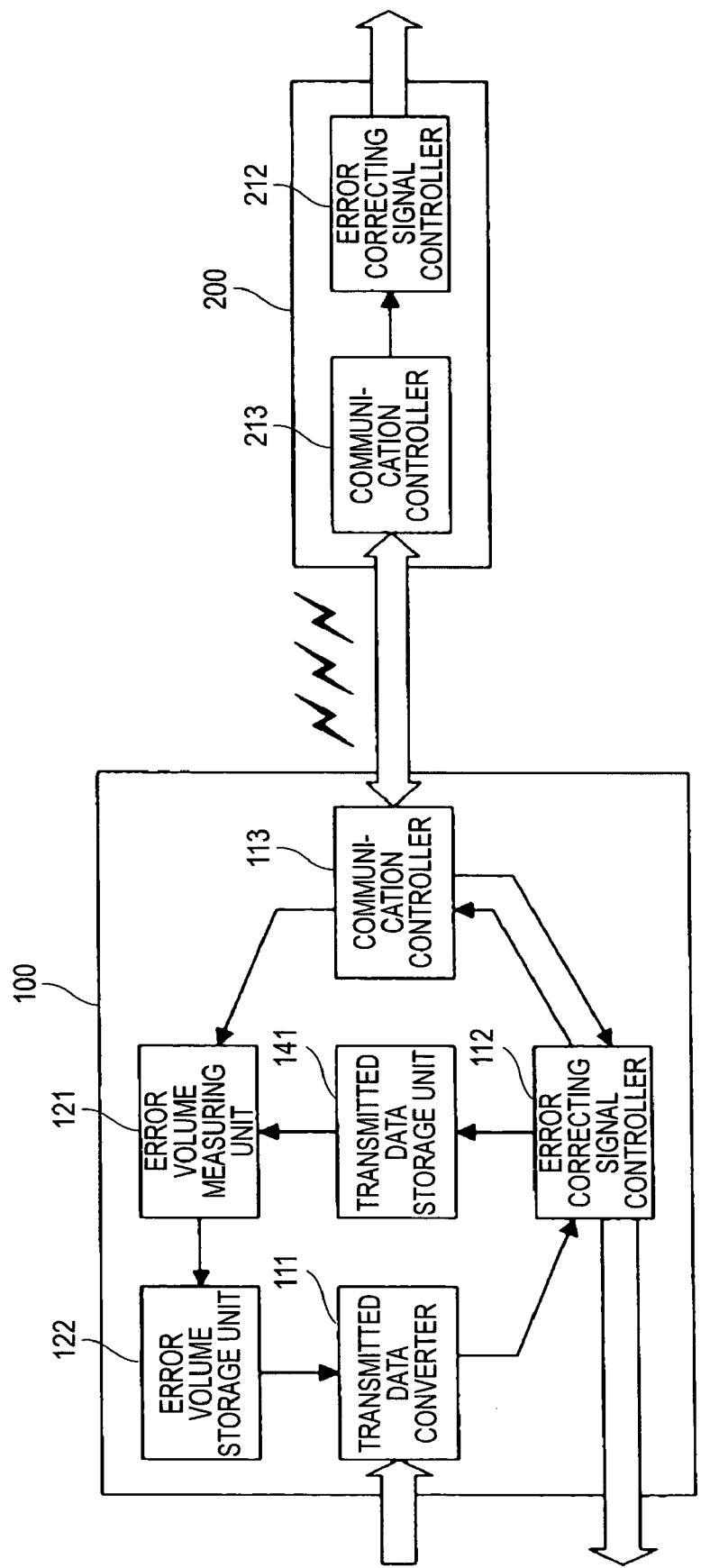
FIG. 9 is a block diagram showing the structure of an information radio transmission system according to Embodiment 5 of this invention.

FIG. 9 is a block diagram showing the structure of an information radio transmission system according to Embodiment 5 of this invention.

In FIG. 9, 100, 111 to 113, 121, 122, 200, 212 and 213 represent the same elements as in FIG. 3. In FIG. 9, the transmitting-side communication device 100 has a transmitted data storage unit 141 that stores transmitted data at the time of transmission.

Figure 10:
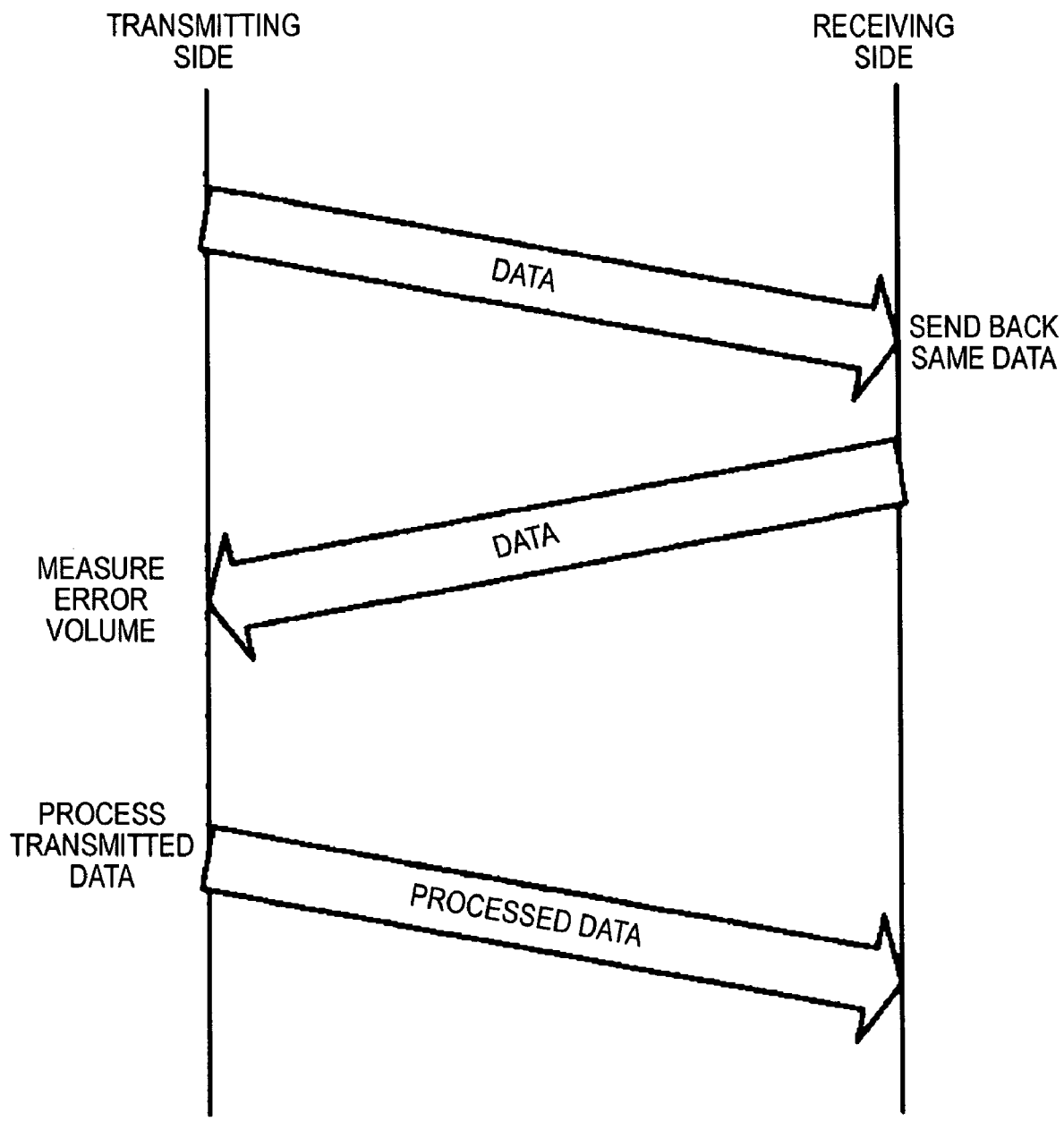
FIG. 10 is a sequence chart showing the operation of the information radio transmission system according to Embodiment 5 of this invention.

FIG. 10 is a sequence chart showing the operation of the information radio transmission system according to Embodiment 5 of this invention.

The operation will now be described.

When transmitting data, first, the condition of the transmission line is checked. This is done in accordance with the following procedure. In the transmitting-side communication device 100 of FIG. 9, transmitted data is provided from the transmitted data converter 111 to the error correcting signal controller 112, and error correction coding is performed to acquire a transmitted data string. The resulting data string is stored into the transmitted data storage unit 141 and is also transmitted from the communication controller 113.

In the receiving-side communication device 200, the communication controller 213 receives the transmitted data and sends back the received data to the transmitting side from the communication controller 213. The error correcting signal controller 212 also performs error correction of the received transmitted data, thus acquiring a received data string.

In the transmitting-side communication device 100, the communication controller 113 receives the sent-back data string and provides it to the error volume measuring unit 121. The error volume measuring unit 121 compares the sent-back data string with the transmitted data stored in the transmitted data storage unit 141 and measures the error volume from the result of this comparison. The error volume thus acquires is stored into the error volume storage unit 122.

In Embodiment 5, in this manner, data is sent back and the sent-back data is compared with the original transmitted data to measure the error volume. This error volume is used as control information. That is, when transmitting data, the transmitted data converter 111 controls transmitted data on the basis of the latest error volume stored in the error volume storage unit 122.

According to Embodiment 5, a transmitted data string is stored and it is compared with a sent-back data string to measure the error volume. Thus, the error volume can be accurately measured even when an error exceeding the error correction ability occurs. As the volume of transmitted data of the next transmission is controlled on the basis of this error volume, optimum data transmission can be realized. This enables improvement in the data transmission efficiency.

Embodiment 6

In Embodiment 1, the error volume is measured from the latest received error volume measuring data string. However, the method for measuring the error volume can be changed. In Embodiment 6, the history of the error volume is saved in the receiving-side communication device, and the error volume is measured by using this history of the error volume.

As the error volume is thus measured by using the history, even when the communication condition accidentally changes to significantly deteriorate or significantly improve, the influence of the accidental change can be reduced.

Hereinafter, Embodiment 6 of this invention will be described with reference to the drawings.

Figure 11:
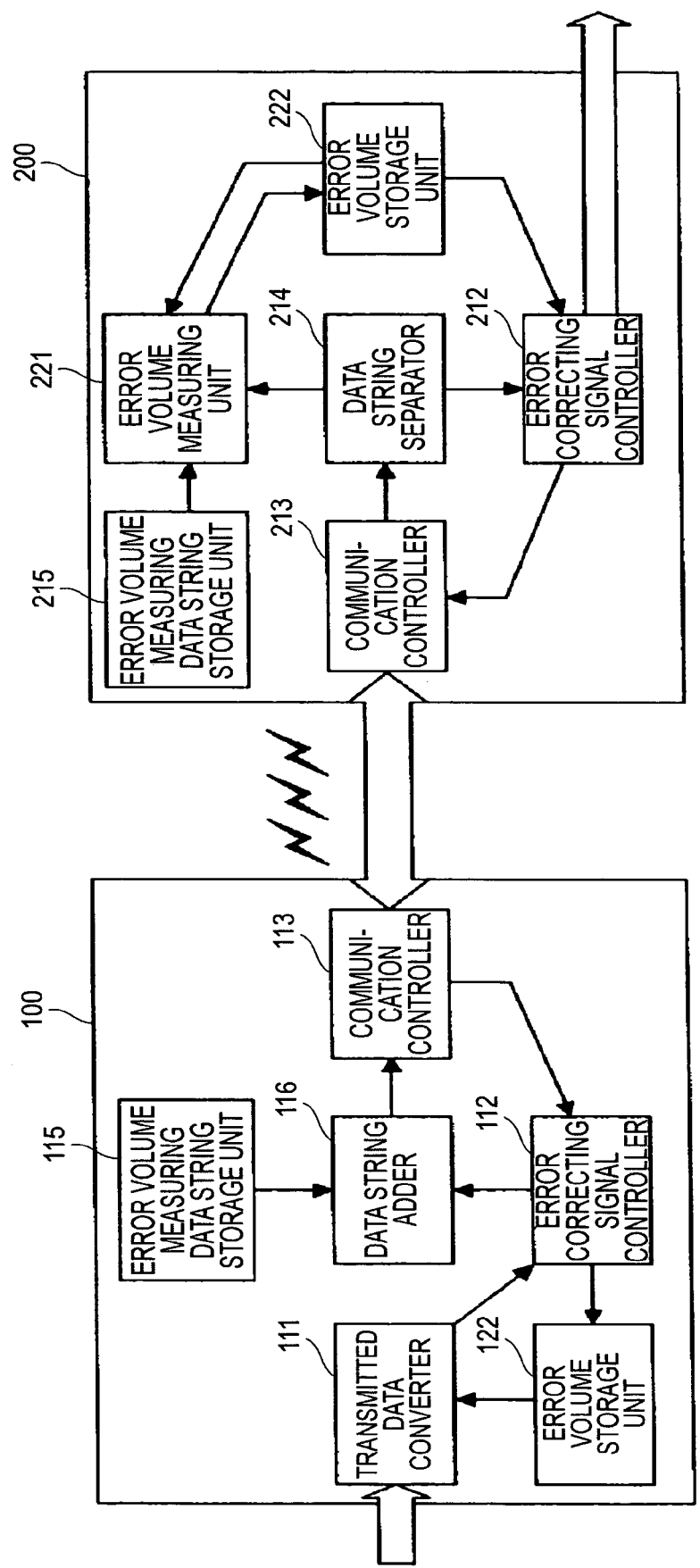
FIG. 11 is a block diagram showing the structure of an information radio transmission system according to Embodiment 6 of this invention.

FIG. 11 is a block diagram showing the structure of an information radio transmission system according to Embodiment 6 of this invention.

In FIG. 11, 100, 111 to 113, 115, 116, 122, 200, 212 to 215 and 221 represent the same elements as in FIG. 1. In FIG. 11, the receiving-side communication device 200 has an error volume storage unit 222 that stores the history of the error volume.

The operation will now be described with reference to FIG. 2, which is now incorporated in this Embodiment.

As in FIG. 2, a transmitted data string with an error volume measuring data string added thereto is transmitted from the transmitting-side communication device 100.

Also in the receiving-side communication device 200, the processing similar to the processing shown in FIG. 2 is carried out. The error volume measuring unit 221 compares the received error volume measuring data string with an error volume measuring data string stored in advance in the error volume measuring data string storage unit 215. The error volume is measured from the result of this comparison and is stored into the error volume storage unit 222. Moreover, the error volume measuring unit 221 calculates the error volume from the history of the error volume stored in the error volume storage unit 222, including the error volume prepared now, and stores the calculated error volume into the error volume storage unit 222.

Next, the error volume prepared on the basis of the history of the error volume in the receiving-side communication device 200 is sent back to the transmitting-side communication device 100. Therefore, the error volume measuring unit 221 provides the measured error volume to the error correcting signal controller 212. The error correcting signal controller 212 performs error correction coding of the received error volume and the result is sent back to the transmitting side from the communication controller 213.

In the transmitting-side communication device 100, as in FIG. 2, the communication controller 113 receives the data of the coded error volume. The error correcting signal controller 112 decodes the received data. The error volume thus acquired is stored into the error volume storage unit 122.

When using this error volume as control information, the transmitted data converter 111 controls transmitted data on the basis of the latest error volume store din the error volume storage unit 122 at the time of data transmission.

According to Embodiment 6, even when the communication conditions accidentally changes to significantly deteriorate or significantly improve, it is possible to reduce the influence of the accidental change.

Embodiment 7

In Embodiment 1, the error volume is measured from the latest received error volume measuring data string. However, the method for measuring the error volume can be changed. In Embodiment 7, the history of the error volume is saved in the transmitting-side communication device, and the error volume is measured by using this history of the error volume. As the error volume is thus measured by using the history, even when the communication condition accidentally changes to significantly deteriorate or significantly improve, the influence of the accidental change can be reduced.

Hereinafter, Embodiment 7 of this invention will be described with reference to the drawings.

Figure 12:
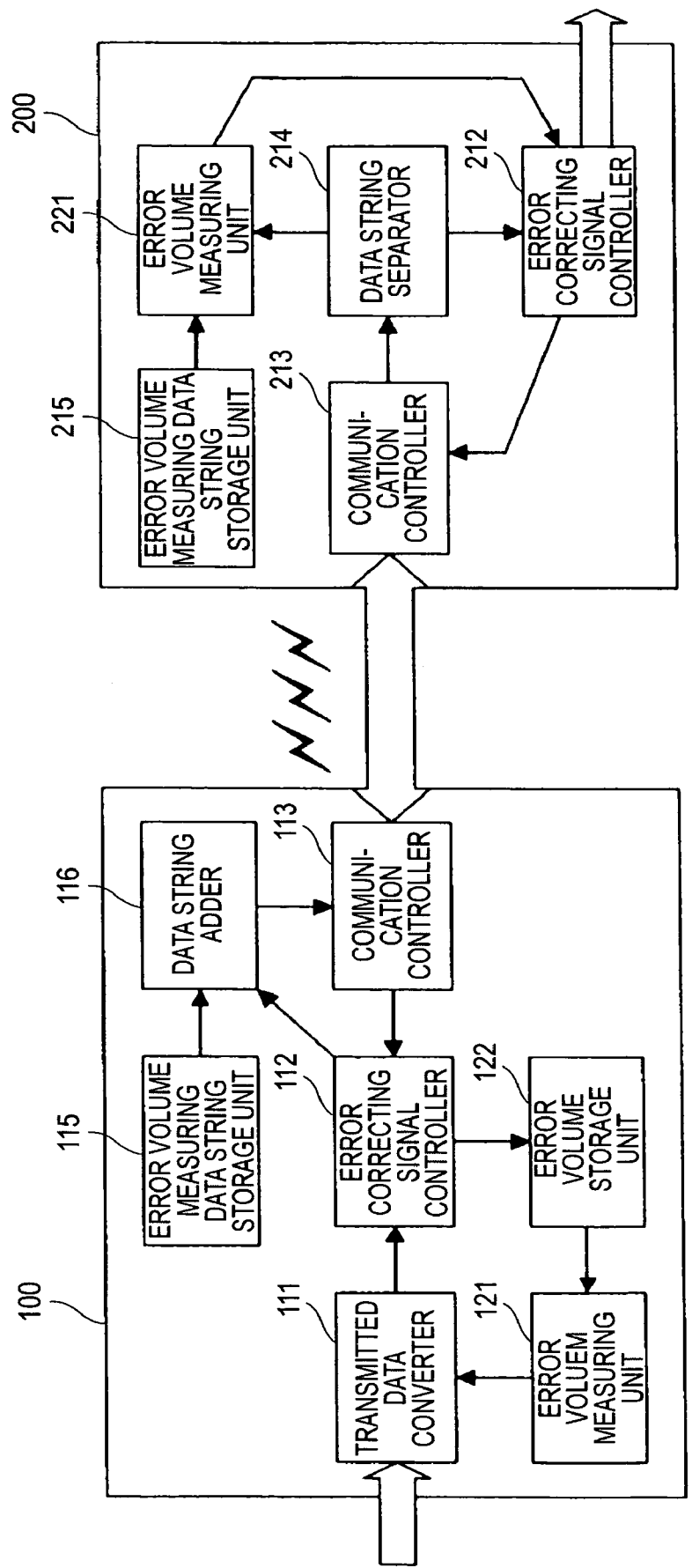
FIG. 12 is a block diagram showing the structure of an information radio transmission system according to Embodiment 7 of this invention.

FIG. 12 is a block diagram showing the structure of an information radio transmission system according to Embodiment 7 of this invention.

In FIG. 12, 100, 111 to 113, 115, 116, 122, 200, 212 to 215 and 221 represent the same elements as in FIG. 1. In FIG. 12, the transmitting-side communication device 100 has an error volume measuring unit 121 that measures the error volume.

The operation will now be described with reference to FIG. 2, which is now incorporated in this Embodiment.

As in FIG. 2, a transmitted data string with an error volume measuring data string added thereto is transmitted from the transmitting-side communication device 100.

Also in the receiving-side communication device 200, the processing similar to the processing shown in FIG. 2 is carried out. The error volume measuring unit 221 compares the received error volume measuring data string with an error volume measuring data string stored in advance in the error volume measuring data string storage unit 215. The error volume is measured from the result of this comparison and is stored into the error volume storage unit 222.

Next, the error volume prepared on the basis of the history of the error volume in the receiving-side communication device 200 is sent back to the transmitting-side communication device 100. Therefore, the error volume measuring unit 221 provides the measured error volume to the error correcting signal controller 212. The error correcting signal controller 212 performs error correction coding of the received error volume and the result is sent back to the transmitting side from the communication controller 213.

In the transmitting-side communication device 100, the communication controller 113 receives the data of the coded error volume. The error correcting signal controller 112 decodes the received data. The error volume thus acquired is stored into the error volume storage unit 122.

When using this error volume as control information, the error volume measuring unit 121 calculates the error volume from the history of the error volume stored in the error volume storage unit 122 at the time of data transmission, and the transmitted data converter 111 controls transmitted data on the basis of this error volume.

According to Embodiment 7, even when the communication conditions accidentally changes to significantly deteriorate or significantly improve, it is possible to reduce the influence of the accidental change.

Embodiment 8

In Embodiment 1, the method for measuring the error volume is described. However, the method for controlling transmitted data can be changed on the basis of this error volume. In Embodiment 8, when transmitting static image data of JPEG 2000, the compression rate of the JPEG 2000 image is changed in accordance with the error volume, and also the tile size is changed.

As the compression rate and the tile size are thus changed when transmitting static image data of JPEG 2000, degradation in the image quality due to change in the data volume can be restrained, compared with the case of changing only the compression rate.

FIG. 13 is a diagram for explaining the data structure of JPEG 2000.

In FIG. 13, an image is divided into tile 1, tile 2, tile 3 and tile 4. Its data structure includes a header and tile data of each tile.

FIG. 14 is a diagram for explaining a tile division function of JPEG 2000.

In FIG. 14, tile 2 is restored.

FIG. 15 is a diagram for explaining the tile division function of JPEG 2000.

In FIG. 15, if an error occurs in the case of no division, the entire data contains the error. If an error occurs in the case of bisection, a half of the data contains the error and the remaining half is saved. If an error occurs in the case of quadrisection, only ¼ of the data contains the error and the remaining ¾ is saved.

FIG. 16 is a diagram for explaining a mode of changing the data size of an image.

In FIG. 16, the image quality is better at a smaller compression rate.

FIG. 18 is a diagram for explaining a mode of changing the image size of an image.

Before explaining Embodiment 8, the tile division function of JPEG 2000 will be described.

JPEG 2000 enables division and compression of an image into rectangular areas that are called tiles, at the time of image compression. The data thus compressed includes data of a header containing image information, and data of each tile, as shown in FIG. 13.

In the case where an image is compressed without being divided, if an error occurs in a part of the data, the image cannot be restored. However, in the case where an image is divided into tiles and compressed, the influence of an error can be limited to only a part of the data area, as shown in FIG. 15. For example, in the case where an image divided into tiles and compressed, even if the tile data of tile 1, tile 3 and tile 4 are damaged as shown in FIG. 14, the image corresponding to the tile 2 can be restored.

In this manner, JPEG 2000 enables increase in error resistance by dividing an image into tiles.

The image quality is coarser as the tile size is smaller, and the image quality is finer as the tile size is larger. This means that the image quality can be changed by changing the tile size.

Now, controlling the volume of transmitted data in accordance with the condition of the transmission line is considered. When the condition of the transmission line is bad, the compression rate of the image is increased to reduce the data volume. When the condition of the transmission line is good, the compression rate is lowered to increase the data volume. The image quality is thus improved.

However, there is a conventional problem that if the data volume is reduced, the image quality is so degraded that the contents of the image cannot be confirmed.

As described above, the image quality is changed by changing the tile size. Thus, in this invention, the tile size is changed in accordance with the change in the compression rate, thereby reducing the influence of the change in the compression rate on the degradation in the image quality. When the data size is increased, the image is divided into small tiles to increase the error resistance. When the data size is reduced, the image is divided into large tiles to restrain degradation in the image quality.

In this manner, when the data volume of a JPEG 2000 image is changed in accordance with the communication condition, the influence of the change in the data volume on the image quality can be reduced.

Hereinafter, Embodiment 8 of this invention will be described with reference to the drawing.

Figure 17:
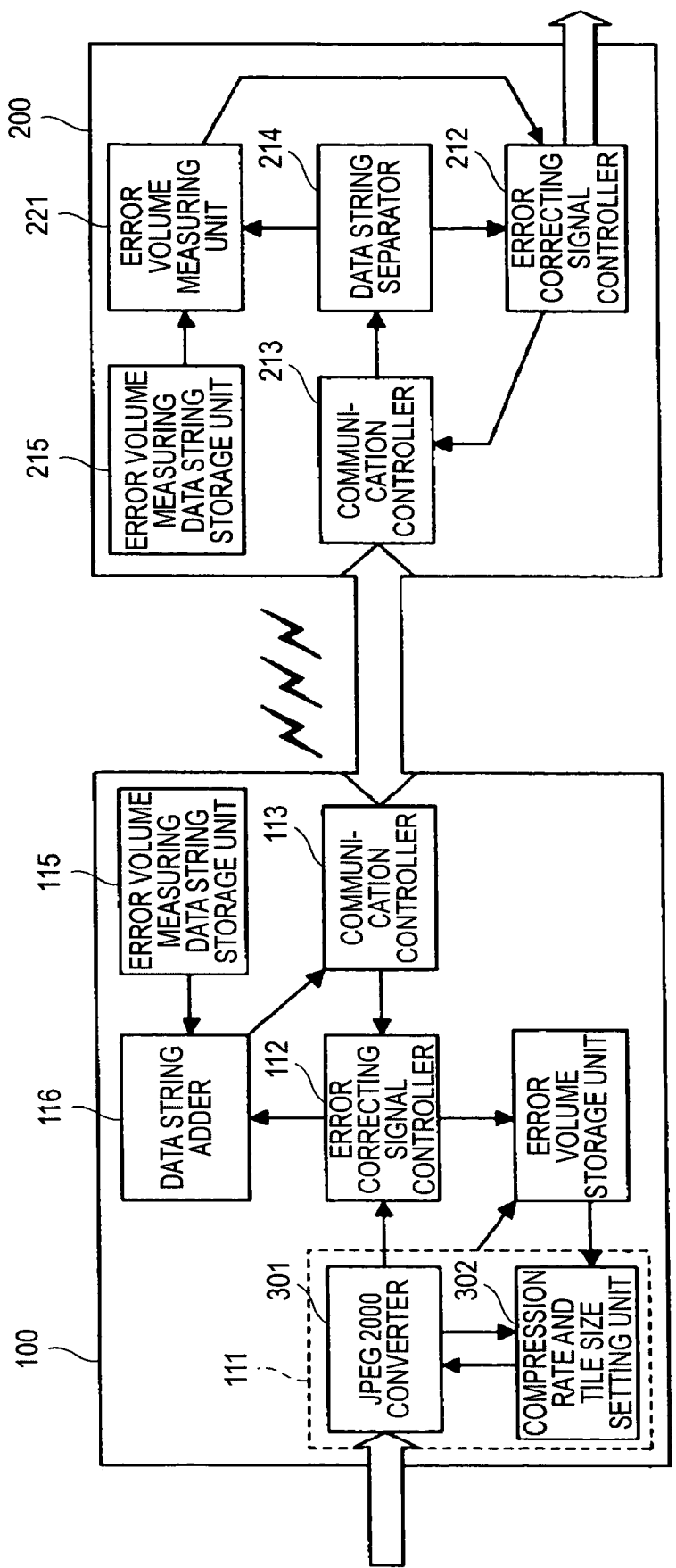
FIG. 17 is a block diagram showing the details of a transmitted data converter of an information radio transmission system according to Embodiment 8 of this invention.

FIG. 17 is a block diagram showing the details of a transmitted data converter of an information radio transmission system according to Embodiment 8 of this invention.

In FIG. 17, 100, 111 to 113, 115, 116, 122, 200, 212 to 215 and 221 represent the same elements as in FIG. 1. FIG. 17 shows the details of the transmitted data converter 111. Specifically, the transmitted data converter 111 has an image data converter 301 that converts received image data to a JPEG 2000 image, and a compression rate and tile size setting unit 302 that decides the compression rate and tile size when converting a static image on the basis of the error volume.

The operation will now be described.

It is assumed that the error volume has been measured in advance by the operation of Embodiment 1.

Triggered by receiving static image data, the transmitted data converter 111 requests the error volume from the error volume storage unit 122. In response to the request, the error volume storage unit 122 provides the error volume to the compression rate and tile size setting unit 302. The compression rate and tile size setting unit 302 decides the set values of the compression rate and tile size on the basis of the received error volume and provides the values to the JPEG 2000 converter 301. The JPEG 2000 converter 301 converts the static image data to a JPEG 2000 image on the basis of the received set values and thus prepares transmitted data.

According to Embodiment 8, when transmitting JPEG 2000 image data, the volume of transmitted data can be changed in accordance with the condition of the transmission line, and at the same time, degradation in the image quality due to change in the data volume can be restrained.

Embodiment 9

In Embodiment 1, the method for measuring the error volume is described. However, the method for controlling transmitted data on the basis of this error volume can be changed. In Embodiment 9, when transmitting JPEG 2000 static image data, the longitudinal and lateral side of the JPEG 2000 image is changed in accordance with the error volume, and the tile size is changed, too.

As the longitudinal and lateral size of the image and the tile size are thus changed when transmitting JPEG 2000 static image data, degradation in the image quality due to change in the data volume can be restrained, compared with the case of changing only the longitudinal and lateral size of the image.

The tile function of JPEG 2000 is already described above in Embodiment 8 of this invention.

FIG. 18 is a diagram for explaining a mode of changing the data size of an image.

In FIG. 18, a case of large longitudinal and lateral size and a case of small longitudinal and lateral size of an image are shown.

Now, controlling the volume of transmitted data in accordance with the condition of the transmission line is considered. When the condition of the transmission line is bad, the longitudinal and lateral size of the image is reduced to reduce the data volume. When the condition of the transmission line is good, the longitudinal and lateral size of the image is increased to increase the data volume. Thus, the image quality is improved.

However, there is a conventional problem that if the data volume is reduced, the image quality is so degraded that the contents of the image cannot be confirmed.

As described above, the image quality is changed by changing the tile size. Thus, the tile size is changed in accordance with the change in the longitudinal and lateral size of the image, thereby reducing the influence of the change in the longitudinal and lateral size of the image on the degradation in the image quality. When the data size is increased, the image is divided into small tiles to increase the error resistance. When the data size is reduced, the image is divided into large tiles to restrain degradation in the image quality.

In this manner, when the data volume of a JPEG 2000 image is changed in accordance with the communication condition, the influence of the change in the data volume on the image quality can be reduced.

Hereinafter, Embodiment 9 of this invention will be described with reference to the drawing.

Figure 19:
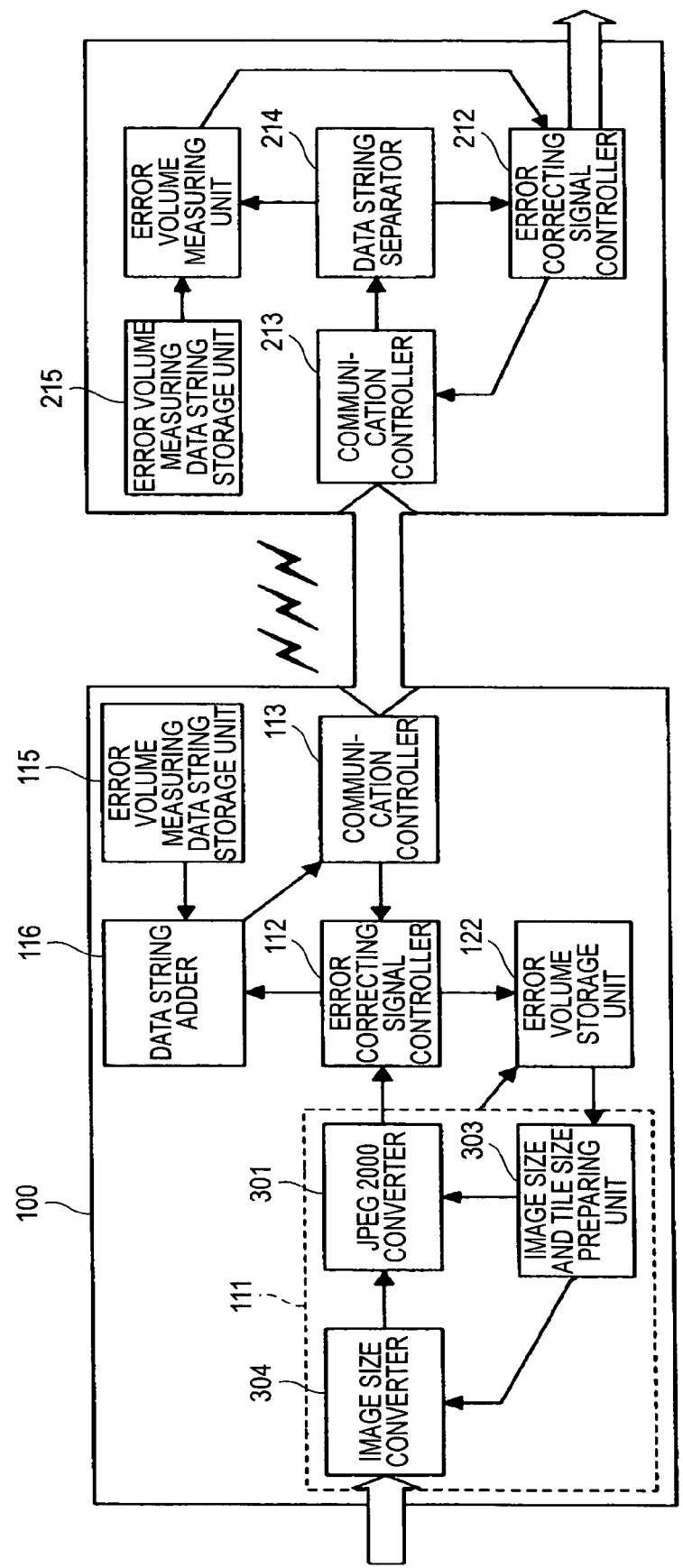
FIG. 19 is a block diagram showing the details of a transmitted data converter of an information radio transmission system according to Embodiment 9 of this invention.

FIG. 19 is a block diagram showing the details of a transmitted data converter of an information radio transmission system according to Embodiment 9 of this invention.

In FIG. 19, 100, 111 to 113, 115, 116, 122, 200, 212 to 215 and 221 represent the same elements as in FIG. 1. FIG. 19 shows the details of the transmitted data converter 111. Specifically, the transmitted data converter 111 has an image size and tile size preparing unit 303 that decides the longitudinal and lateral size of the image and the tile size when converting a static image, on the basis of the error volume, an image data converter 301 that converts the received image data to a JPEG 2000 image of the tile size decided by the image size and tile size preparing unit 303, and an image size converter 304 that converts the longitudinal and lateral size of the received static image to the size set by the image size and tile size preparing unit 303.

The operation will now be described.

It is assumed that the error volume has been measured in advance by the operation of Embodiment 1.

Triggered by receiving static image data, the transmitted data converter 111 requests the error volume from the error volume storage unit 122. In response to the request, the error volume storage unit 122 provides the error volume to the image size and tile size preparing unit 303. The image size rate and tile size preparing unit 303 decides the set values of the image size and tile size on the basis of the received error volume and provides the values to the JPEG 2000 converter 301 and the image size converter 304. The image size converter 304 converts the longitudinal and lateral size of the image on the basis of the received set values. The JPEG 2000 converter 301 converts the static image data to a JPEG 2000 image of the tile size based on the received set values and thus prepares transmitted data.

According to Embodiment 9, when transmitting JPEG 2000 image data, the volume of transmitted data can be changed in accordance with the condition of the transmission line, and at the same time, degradation in the image quality due to change in the data volume can be restrained.

What is claimed is:

1. An information radio transmission system comprising:
   a transmitting-side communication device that transmits data by radio transmission;
   a receiving-side communication device that receives the data transmitted from the transmitting-side communication device, wherein each of the transmitting-side communication device and the receiving-side communication device has an error volume measuring data string storage unit that stores an error volume measuring data string;
   at least one of the transmitting-side communication device and the receiving-side communication device has an error volume measuring unit that measures an error volume in data transmissions; and
   the error volume measuring unit compares the error volume measuring data transmitted from the other device with the error volume measuring data string stored in the error volume measuring data string storage unit of the one device, thereby measuring the error volume.

2. The information radio transmission system as claimed in claim 1, wherein the error volume measuring unit is provided in the receiving-side communication device, and the transmitting-side communication device adds the error volume measuring data string to the transmitted data and then transmits the data to the receiving-side communication device, and the receiving-side communication device measures the error volume by the error volume measuring unit, using the error volume measuring data string transmitted thereto.

3. The information radio transmission system as claimed in claim 1, wherein the error volume measuring unit is provided in the transmitting-side communication device, and the transmitting-side communication device requests transmission of the error volume measuring data string from the receiving-side communication device, then receives the error volume measuring data string transmitted from the receiving-side communication device in response to the request, and measures the error volume by the error volume measuring unit, using the received error volume measuring data string.

4. The information radio transmission system as claimed in claim 1, wherein the error volume measuring unit is provided in the transmitting-side communication device, and the transmitting-side communication device receives the error volume measuring data string added to data and transmitted from the receiving-side communication device, and measures the error volume by the error volume measuring unit, using the received error volume measuring data string.

5. The information radio transmission system as claimed in claim 1, wherein the receiving-side communication device has an error volume storage unit that stores the error volume measured by the error volume measuring unit, as history, and measures the error volume by the error volume measuring unit, using the history of the error volume stored in the error volume storage unit.

6. The information radio transmission system as claimed in claim 1, wherein the transmitting-side communication device has an error volume storage unit that stores the error volume measured by the error volume measuring unit, as history, and measures the error volume by the error volume measuring unit, using the history of the error volume stored in the error volume storage unit.

7. The information radio transmission system as claimed in claim 1, wherein when transmitting JPEG 2000 static image data, the transmitting-side communication device changes the compression rate of the static image and tile size in accordance with the error volume.

8. The information radio transmission system as claimed in claim 1, wherein when transmitting JPEG 2000 static image data, the transmitting-side communication device changes the longitudinal size of the static image and tile size in accordance with the error volume.

9. An information radio transmission system comprising:
a transmitting-side communication device that transmits data by radio transmission;
a receiving-side communication device that receives the data transmitted from the transmitting-side communication device;
wherein the transmitting-side communication device has an error correcting signal controller that performs error correction coding of the transmitted data;
a communication controller that transmits the error-correction-coded transmitted data as packet data;
the receiving-side communication device has an error correcting signal controller that decodes the packet data on the basis of the error correction coding of the received packet data; and
an error measuring unit that measures an error volume in data transmission on the basis of a number of the received packets and a number of the packets that have been successfully decoded.

10. An information radio transmission system comprising:
a transmitting-side communication device that transmits data by radio transmission;
a receiving-side communication device that receives the data transmitted from the transmitting-side communication device, wherein each of the transmitting-side communication device and the receiving-side communication device has a communication controller that transmits data;
the transmitting-side communication device has a transmitted data storage unit that stores transmitted data and an error volume measuring unit that measures an error volume in data transmission;
the receiving-side communication device sends back data transmitted from the transmitting-side communication device; and
the error volume measuring unit of the transmitting-side communication device measures the error volume by comparing the data stored in the transmitted data storage unit with the sent-back data.

* * * * *